United States Patent [19]

Taniyama

[11] Patent Number: 5,213,229
[45] Date of Patent: May 25, 1993

[54] MOTION LIMITING MECHANISM FOR STORAGE CONTAINERS

[76] Inventor: Yoshihiko Taniyama, 9380 Old Southwick Pass, Alpharetta, Ga. 30202

[21] Appl. No.: 974,850

[22] Filed: Nov. 10, 1992

[51] Int. Cl.⁵ .............................................. B65D 43/16
[52] U.S. Cl. .................................. 220/4.23; 220/335; 220/337
[58] Field of Search ....................... 220/4.23, 335, 337, 220/338, 4.22, 340

[56] References Cited

U.S. PATENT DOCUMENTS

| | | | |
|---|---|---|---|
| 3,240,375 | 3/1966 | Burrows | 220/335 X |
| 3,327,886 | 6/1967 | Short | 220/334 X |
| 4,325,492 | 4/1982 | Kunze | 220/335 |
| 4,535,888 | 8/1985 | Nusselder | 206/444 |
| 4,702,369 | 10/1987 | Philosophe | 206/312 |
| 4,750,611 | 6/1988 | Morrone | 206/45.13 |
| 4,793,480 | 12/1988 | Gelardi et al. | 206/312 |
| 4,817,792 | 4/1989 | Seifert | 206/309 |
| 4,880,139 | 11/1989 | Jumel et al. | 220/337 |
| 4,899,875 | 2/1990 | Herr et al. | 206/313 |
| 4,916,567 | 4/1990 | Grobecker et al. | 360/133 |
| 5,048,715 | 9/1991 | Wolff | 220/335 |
| 5,101,971 | 4/1992 | Grobecker | 206/232 |

FOREIGN PATENT DOCUMENTS

| | | | |
|---|---|---|---|
| 0420350 | 4/1991 | European Pat. Off. | 206/310 |
| 444499 | 10/1934 | United Kingdom | 220/337 |
| 780228 | 7/1957 | United Kingdom | 220/337 |
| 781947 | 8/1957 | United Kingdom | 220/337 |

*Primary Examiner*—Steven M. Pollard
*Attorney, Agent, or Firm*—Troutman Sanders

[57] ABSTRACT

A motion limiting mechanism for hingedly connected storage containers having a base tray and a cover. The bottom portion of the base tray is increased such that it creates an interference with the top rear edge of the cover to limit the cover's range of motion. The rear bottom corner of the base tray is preferably rounded such that the top rear edge of the cover meets the bottom rear corner of the base tray at a point above the bottom surface of the base tray.

10 Claims, 3 Drawing Sheets

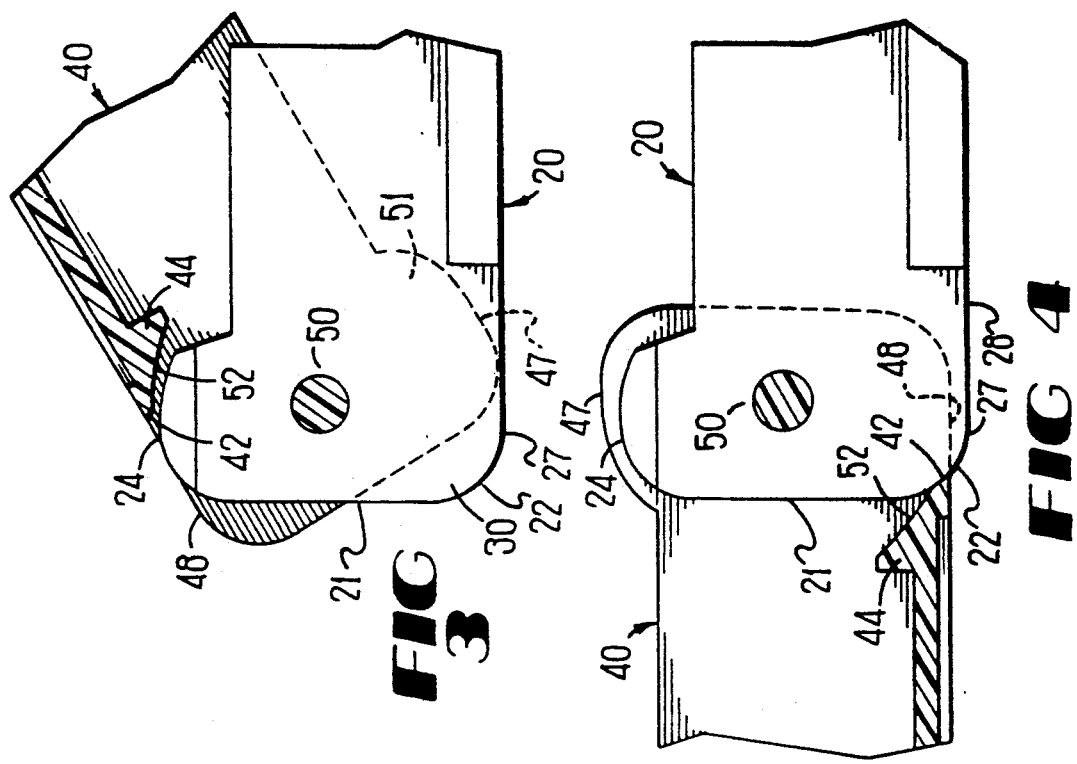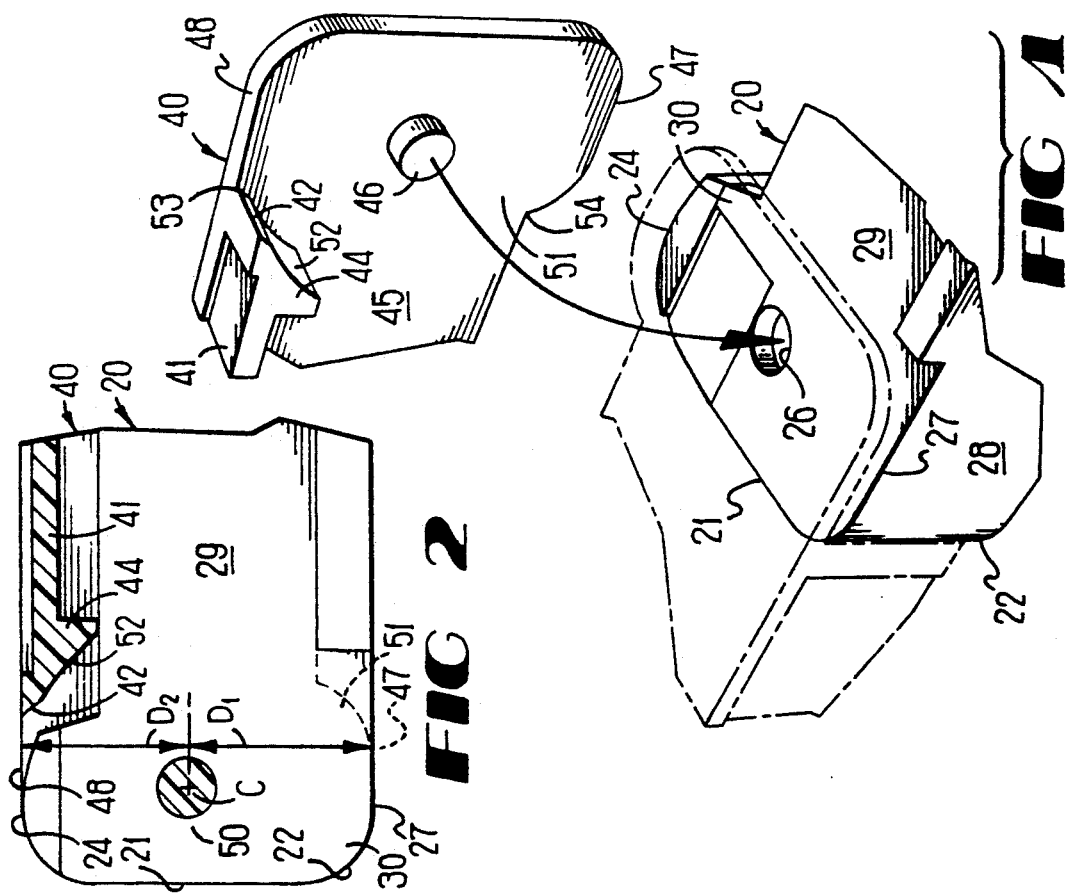

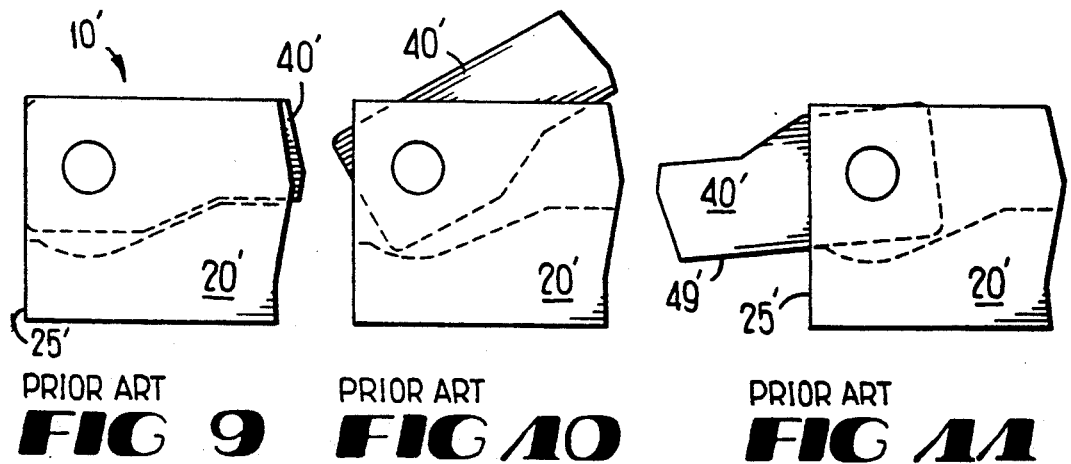
PRIOR ART
FIG 9
PRIOR ART
FIG 10
PRIOR ART
FIG 11
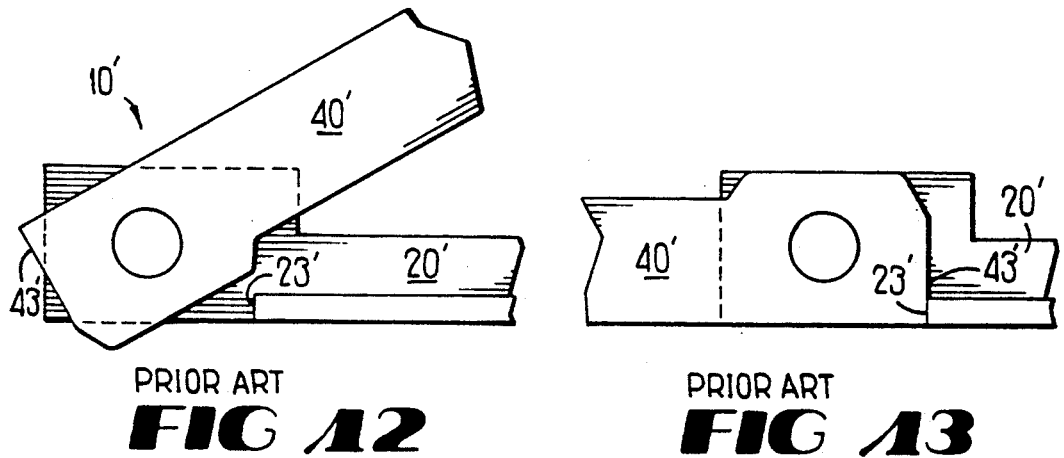
PRIOR ART
FIG 12
PRIOR ART
FIG 13
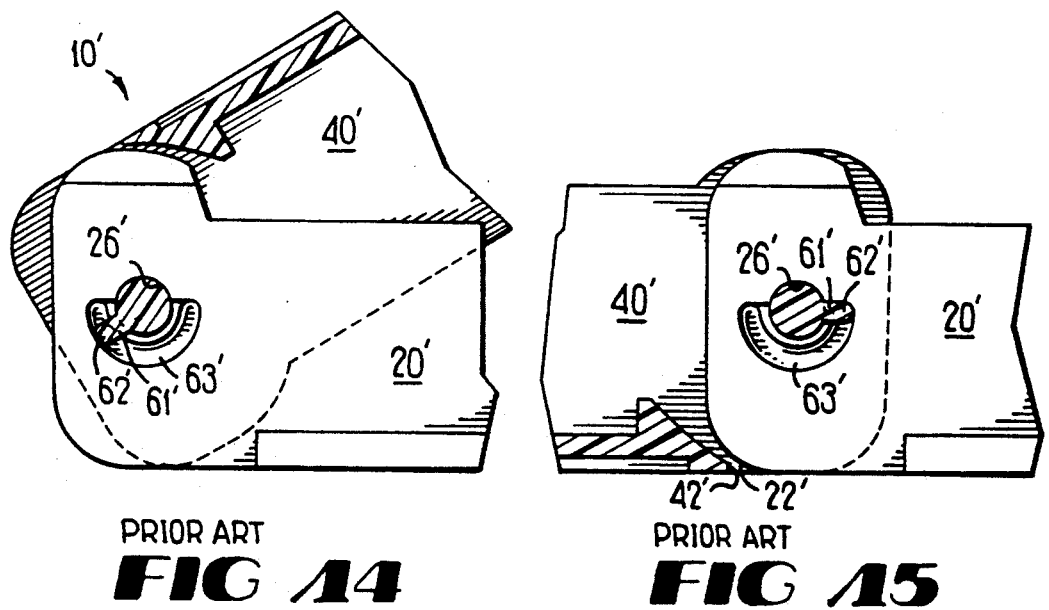
PRIOR ART
FIG 14
PRIOR ART
FIG 15

MOTION LIMITING MECHANISM FOR STORAGE CONTAINERS

BACKGROUND OF THE INVENTION

1. Field of Invention

This invention relates to a motion limiting device for a storage container. More specifically, this invention relates to a base tray having an increased bottom portion that combines with the rear edge of the cover to limit the range of motion of the container.

2. Description of the Prior Art

Storage containers for compact disks, mini-disk cartridges, and the like often consist of a base tray and cover, which are hingedly connected at their rear. In order to alleviate the possibility of an object, such as promotional material, a compact disk or a mini-disk cartridge, from falling out of the cover of the storage container when the container is in the open position, motion limiting mechanisms have been incorporated into some containers. A preferred range of motion for the cover of such containers has been found to be 180 degrees from the closed to the open position. If the material or object inserted into the cover becomes dislodged, the 180 degree limitation restricts the article to falling within the container.

An example of one such motion limiting mechanism is shown in FIGS. 9-11. This mechanism utilizes a base tray 20' with the rear edge 25' extending slightly upward such that a top rear portion 49' of the cover 40' may rest against this base tray's bottom upwardly extending portion 25' when the container 10' is in the open position. This mechanism may adequately limit the range of motion of the cover 40' to 180 degrees. However, it does not allow the cover 40' to rest substantially horizontally against a surface in the completely open position, rather it is suspended outward. Therefore, this container 10' is likely to be both unwieldy and less pleasing to the eye due to the fact that the cover 40' seems to be hanging from the rear of the base tray, rather than resting on a surface other than the base tray in harmony with the base tray. Also, all of the pressure from the weight of the cover 40' and the object or material resting in it is placed on one edge of the cover 40', which may cause the cover 40' to break or become warped.

Another example of a motion limiting mechanism is a base try with a rear ledge extending slightly horizontally outward from its bottom such that the rear of the cover rests against the ledge when the container is in the completely open position of 180 degrees. This mechanism is sufficient for limiting the range of motion of the cover to 180 degrees. However, this mechanism usually only works well for squared cornered containers and adds to the length of the container. This configuration would likely make the container both more cumbersome due to the increased length of the base tray, less attractive to the eye due to the square edges, and most importantly more dangerous due to its pointed corners versus a container with rounded edges.

FIGS. 12 and 13 are yet another illustration of a prior art motion limiting mechanism. This mechanism makes use of squared rear side wall edges 23' on the base tray 20' and squared rear edges 43' on the cover 40'. When the container 10' is in the completely open position, the cover 40' is adequately limited in motion to 180 degrees. However, as discussed for the motion limiting mechanism with the rear ledge extending outward, this mechanism is seemingly only adaptable to containers 10, having squared rear edges 23' and 43'. Therefore, the container 10' is again more hazardous due to its pointy corners than a container 10' with rounded corners. Moreover, it is seemingly less pleasing to the eye due to the squared edges.

FIGS. 14 and 15 disclose a slightly different approach to limiting the motion of the cover 40'. This motion limiting mechanism incorporates an arcuate slot 63' formed below a hinged depression or hole 26' in the inner rear side portion of the base tray 20' with a corresponding motion limiting protrusion 62' in the outer rear side portion of the cover 40'. The motion limiting protrusion 62' rests within the arcuate slot 63', which may also be formed above or on either side of the hinged depression 26'. The arc of the arcuate slot 63' may be enlarged or decreased to adapt to varying ranges of motion such that the range of motion of the cover 40' may vary from within 0 to 360 degrees. Problems have been found with this mechanism in that the protrusion 62' may break off after opening the container 10' many times. Therefore, a rib 61' is often utilized to provide reinforcement and added strength to the protrusion 62'. Unlike the previously described motion limiting mechanisms, this mechanism is hidden within the container 10' such that this configuration is less cumbersome and more pleasing to the eye, especially when rounded edges are employed. However, as the container 10' is increasingly opened and closed and other external pressures are applied to it, the protrusion 62' still occasionally tends to crack or break off.

SUMMARY OF THE INVENTION

It has previously been established that a need exists for a storage container for mini-disk cartridges and the like having the ability to limit the cover's range of motion to approximately 180 degrees. However, a further need exists for such a mechanism to be durable, safe, and cosmetically pleasing. These and other objects are achieved by the motion limiting mechanism of the present invention for a container having a hingedly connected base tray and cover.

In the preferred embodiment, the motion limiting mechanism includes a base tray hingedly connected to a cover or lid. The height of both the base tray and the lid are defined by the respective rear portions of their side walls. Unlike previous hinged storage containers which have hinge mechanisms with centers of rotation at points equidistant between bottom and top edges of the side walls, the distance between the center of rotation of the present hinge and the bottom edges of the lid and base tray side walls has been slightly increased, thereby proportionately increasing the total height of the container. The bottom rear corner of the base tray is preferably rounded and the top rear edge of the cover, which is typically positioned at a point slightly before the rear end of the cover's side wall, is a preferably curved ledge.

When the present container is opened, the top rear edge of the lid rotates adjacent the rear portions of the base tray but preferably does not engage the base tray until it has rotated approximately 180 degrees. When the lid has rotated approximately 180 degrees such that the container is in a completely open position, the increased distance from the center of rotation of the hinge to the bottom of the base tray allows a portion of the lid to engage the bottom rear corner of the base tray. This interference between the top rear edge of the lid and the bottom rear portion of the base tray limits the range of motion of the lid to the predesigned range, in this case approximately 180 degrees. When the cover is in the 180 degree rotated position the top rear edge of the lid preferably meets the bottom rear corner of the base tray from a point below the rounded corner and at a point above the bottom surface of the base tray.

The lid may also be hingedly connected to the base tray at a point equidistant between the bottom and top edges of the side walls of the base tray. In this embodiment, the height of the lid's side walls should be slightly shorter than the base tray's side walls. This embodiment operates similarly to the preferred embodiment, with the exception that if the lid's side walls rather than the base tray's side walls are the outermost exterior walls of the container in the closed position, then the lid sidewalls do not completely overlap the base tray sidewalls. However, in this embodiment the lid's side walls may be concealed by the base tray's side walls when the container is in a closed position by constructing the base tray so that its side walls are the outermost exterior walls of the container.

The rounded bottom rear corner of the base tray of this motion limiting mechanism is safer than the squared edges of other motion limiting mechanisms. It is also advantageous for manufacturing purposes because there is less chance of an edge getting caught on in assembly belt or similar equipment in the assembly process. Moreover, the curvatures are also more aesthetically pleasing to the eye.

This mechanism is also more durable than prior similar mechanisms since the base tray's portion of the mechanism is formed of the bottom and rear of the base tray, rather than a mere extension either from the base tray's bottom or side wall. Further, the use of a motion limiting protrusion, which tends to break off, is avoided with this invention.

BRIEF DESCRIPTION OF THE DRAWINGS

The accompanying drawings illustrate the preferred but nevertheless an illustrative embodiment of the invention, and serve to aid in the explanation of the principles of the invention.

FIG. 1 is an isolated exploded perspective of a rear side wall of a base tray and a cover with the motion limiting portions, which include the cover's rear ledge and the base tray's rounded rear corner.

FIG. 2 is an isolated cross-sectional side view of the motion limiting mechanism having the cover and base tray rear side walls of equal height with the container in the closed position.

FIG. 3 is an isolated cross-sectional side view of the motion limiting mechanism having the cover and base tray rear side walls of equal height with the cover rotated approximately 30 degrees and the container in the partially open position.

FIG. 4 is an isolated cross-sectional side view of the motion limiting mechanism having the cover and base tray rear side walls of equal height with the cover rotated approximately 180 degrees and the container in the completely open position.

FIG. 9 is an isolated side elevational view of a prior art motion limiting mechanism having a rear edge extending upward and the container in the closed position.

FIG. 10 is an isolated side elevational view of a prior art motion limiting mechanism having a rear edge extending upward with the cover rotated approximately 30 degrees and the container in the partially open position.

FIG. 11 is an isolated side elevational view of a prior art motion limiting mechanism having a rear edge extending upward with the cover rotated approximately 180 degrees and the container in the completely open position.

FIG. 12 is an isolated side elevational view of a prior art motion limiting mechanism having squared base tray rear side wall edges and squared rear cover edges with the cover rotated approximately 30 degrees and the container in the partially open position.

FIG. 13 is an isolated side elevational view of a prior art motion limiting mechanism having squared base tray rear side wall edges and squared rear cover edges with the cover rotated 180 degrees and the container in the completely open position.

FIG. 14 is an isolated cross-sectional side view of a prior art motion limiting mechanism with the motion limiting protrusion having a strengthening rib rotated approximately 30 degrees within the arcuate slot.

FIG. 15 is an isolated cross-sectional side view of a prior art motion limiting protrusion having a strengthening rib rotated 180 degrees within the arcuate slot.

DETAILED DESCRIPTION OF ILLUSTRATIVE EMBODIMENTS

Figures 5, 6:
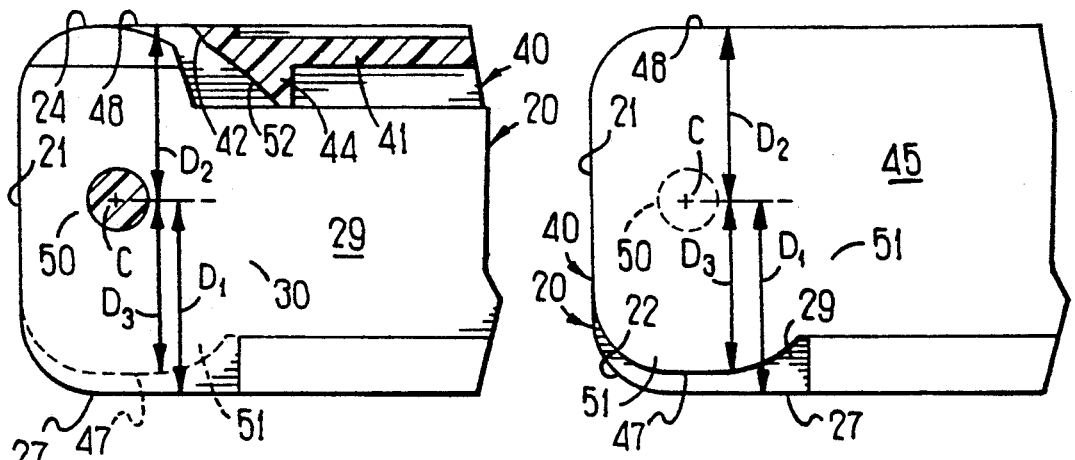
FIG. 5 is an isolated cross-sectional side view of the motion limiting mechanism having the base tray rear side walls of slightly greater height than the cover rear side walls with the container in the closed position.
FIG. 6 is an isolated side elevational view of the motion limiting mechanism having the base tray rear side walls of slightly greater height than the cover rear side walls with the container in the closed position.

In a first preferred illustrative embodiment, referring to FIGS. 1–4, the motion limiting mechanism is preferably formed of a transparent plastic material, though other similar materials may be employed. The mechanism is preferably utilized with storage containers for mini-disk cartridges, compact disks, and the like having a hingedly connected base tray 20 and cover 40. The mechanisms primary function is to limit the motion of the cover 40 in relation to the base tray 20. As shown in FIG. 1, one such hinged connection includes a hinge depression or hole 26 formed in outer rear side walls 29 of the base tray 20 and a hinge protrusion 46 formed on inner rear side walls 45 of the cover 40.

As best shown in FIG. 1, the cover 40 has a pair of side walls 45 having a height defined by a top rear edge 48 and a bottom rear edge 47 of the cover's rear portion 51. The cover's rear portion 51 is defined by the area of each cover's side wall 45 extending rearward from a vertical line between point 53, where a rear ledge 44 begins, and point 54, where the bottom rear edge 47 ends. As shown in FIG. 2, the distance, $D_1$, from the center of rotation, C, of the hinge connection 50 to the bottom rear edge 47, is preferably slightly greater than the distance, $D_2$, from the center of rotation, C, of the hinge connection 50 to the top rear edge 48. A difference in distances, $D_1$ and $D_2$, of 0.8 mm has been found to work adequately.

The side walls 45 of the cover 40 are connected by a top surface 41, which extends to the beginning of the cover's rear portion 51. Formed on the interior of the top surface 41 and beginning of the cover's rear portion 51 is a substantially triangular rear ledge 44. The rear ledge 44 preferably has a slightly curved hypotenuse portion 52, though the hypotenuse portion 52 may be straight. The hypotenuse portion 52 of the rear ledge 44 preferably extends away from the rear portion 51 of the cover 40 and down from the cover's top surface 41. At the point 53 where the rear ledge 44 meets the cover's rear portion 51, the edge 42 of the rear ledge 44 is preferably flat, though the edge 42 may be pointed or curved.

The base tray 20 has a pair of side walls 29 also having a height defined by the base tray's rear portion 30, which includes a top rear edge 24 and a bottom rear edge 27. As shown in FIG. 2 and as with the cover's rear side walls 51, the distance, $D_1$, from the center of rotation of the hinge connection 50 to the bottom rear edge 27, is preferably greater than the distance, $D_2$, from the center of rotation of the hinge connection 50 to the top rear edge 24. Again, a difference in distances, $D_1$ and $D_2$, of 0.8 mm has been found to perform sufficiently. Also, the cover's rear portion 51 substantially overlaps the base tray's rear portion 30 when the base tray 20 and cover 40 are mated.

The base tray's side walls are connected by a bottom surface 28 and a rear wall 21. The base tray's bottom surface 28 and rear wall 21 are also connected and preferably come together in a rounded corner edge 22.

As shown in FIG. 2, when the container 10 is in the closed position, the rear ledge's edge 42 comes in close contact with the base tray's top rear edge 24, but preferably does not touch the base tray's top rear edge 24. As shown in FIG. 3, when the container 10 is opened by rotating the cover 40 upward from the base tray 20, the rear ledge 44 and the rear ledge's edge 42 again preferably come in close contact with the base tray's top rear edge 24 but do not touch the base tray's top rear edge 24.

Finally, as shown in FIG. 4, when the container 10 is in the completely open position, the cover's rear ledge edge 42 engages with the base tray's rounded corner edge 22, unlike 42' and 22' in FIG. 11 of the prior art. Therefore, the base tray's rounded corner edge 22 creates an interference with the cover's rear ledge edge 42 to limit the motion of the cover 40 to approximately 180 degrees. Since the distances, D1, from the center of rotation of the hinge connection 50 to the bottom rear edges 27 and 47 of the base tray and cover respectively are slightly greater than the distances, $D_2$, from the center of rotation of the hinge connection 50 to the top rear edges 24 and 48 of the base tray and cover respectively, the cover's rear ledge edge 42 engages the base tray's rounded corner edge 22 at a point above the base tray's bottom surface 28.

In a second preferred illustrative embodiment, referring to FIGS. 5–8, the cover's rear side walls 45 may be designed such that the center of rotation of the hinge connection 50 is centered an equal distance between the bottom rear edge 47 and the top rear edge 48. As shown in FIG. 5, therefore, the extra distance, $D_1$, below the center of rotation hinge connection 50 of the cover 40 (see FIG. 2) of the first preferred illustrative embodiment is removed creating a new shorter cover rear sidewall 45 distance, $D_3$. As shown in FIG. 6, the bottom portion of the cover's side walls 45 do not completely overlap the bottom portion of the base tray's side walls 29. Though not shown, the aesthetics of this second preferred embodiment may be enhanced by employing a container 10 where the base tray's side walls 29 are the outermost exterior side walls of the container 10. This type of container 10 works well because the portion of the cover's side walls 45 below the hinge connection 50 which are shorter than the portion of the base tray's side walls 29 below the hinge connection 50 are concealed within the container 10 when it is in the closed position so that the user of the container 10 does not notice the cosmetic difference.

Figure 7:
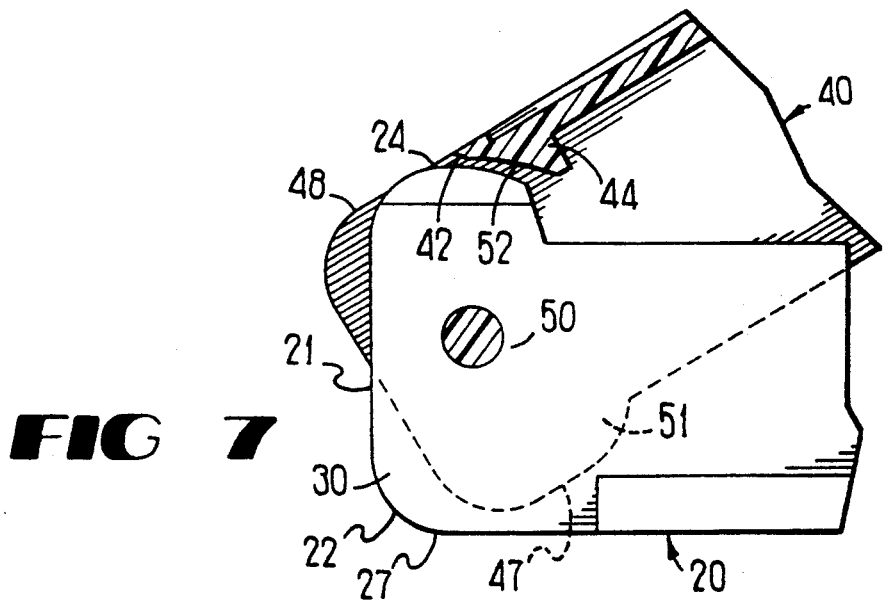
FIG. 7 is an isolated cross-sectional side view of the motion limiting mechanism having the base tray rear side walls of slightly greater height than the cover rear side walls with the cover rotated approximately 30 degrees and the container in the partially open position.

This embodiment operates much like the first preferred illustrative embodiment. As shown in FIGS. 5 and 6, when the container 10 is in the closed position, the rear ledge's edge 42 comes in close proximity with the base tray's rear edge 24, but preferably does not touch it. Also, the cover's rear side walls 45 do not completely overlap the base trays rear side walls 29 due to the shortened distances, $D_3$, on the cover's rear sidewalls 45. As shown in FIG. 7, when the container 10 is rotated opened, the rear ledge 44 and the rear ledge's edge 42 again preferably, while coming close to the base tray's rear edge 24, avoid contact with the base tray's rear edge 24.

Figure 8:
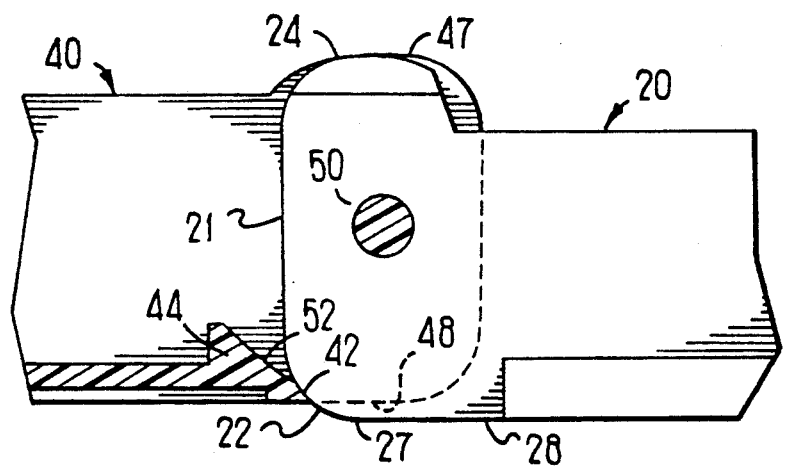
FIG. 8 is an isolated cross-sectional side view of the motion limiting mechanism having the base tray rear side walls of slightly greater height than the cover rear side walls with the cover rotated approximately 180 degrees and the container in the completely open position.

Finally, as shown in FIG. 8, when the container 10 is in the completely open position, the cover's rear ledge 42 comes in contact with the base tray's rounded corner edge 22, thereby, causing the range motion of the cover 40 to be limited to approximately 180 degrees due to this interference fit. Again, since the base tray's rear side walls 29 distance, $D_1$, from the center of rotation of the hinge connection 50 to the bottom rear edges 27 is slightly greater than the cover's rear side walls 45 distance, $D_3$, from the center of rotation of the hinge connection 50 to the top rear edges 48, the cover's rear ledge edge 42 engages the base tray's rounded corner edge 22 at a point above the base tray's bottom surface 28.

I claim:

1. In a storage container comprising a lid member, a base member, and a hinge mechanism connecting said lid member to said base member, the improvement comprising:

means for limiting the range of motion of said lid member with respect to said base member, said motion limiting means including a bottom rear corner portion formed as a part of said base member; and a top rear edge portion formed as a part of said lid member, wherein said bottom rear corner portion engages said top rear edge portion to limit the range of motion of said lid member with respect to said base member.

2. The improvement of claim 1, wherein said base member further includes a side wall having a bottom edge and a top edge, wherein the distance from a center of rotation of said hinge mechanism to said base member bottom edge is greater than the distance from the center of rotation to said base member top edge; and wherein said lid member further includes a side wall having a bottom edge and a top edge, wherein the distance from the center of rotation of the said hinge mechanism to said lid member bottom edge is greater than the distance from the center of rotation of said hinge mechanism to said lid member top edge.

3. The improvement of claim 2, wherein said lid member top rear edge engages said base member bottom rear corner at a point above the horizontal axis of said base member bottom edge.

4. The improvement of claim 1, wherein said base member further includes a side wall having a bottom edge and a top edge, wherein the distance from the center of rotation of said hinge mechanism to said base member bottom edge is greater than the distance from center of rotation of said hinge mechanism to said base member top edge; and wherein said lid member further includes a side wall having a bottom edge and a top edge, wherein the distance from the center of rotation of said hinge mechanism to said lid member bottom edge is equal to the distance from said center of rotation of said hinge mechanism to said lid member top edge.

5. The improvement of claim 4, wherein said lid member top rear edge engages said base member bottom rear corner at a point above the horizontal axis of said base member bottom edge.

6. The improvement of claim 1, wherein said base member bottom rear corner of said lid member is rounded.

7. The improvement of claim 1, wherein said lid member top rear edge has a curved interior surface.

8. The improvement of claim 1, wherein said lid member top rear edge has a pointed outer edge.

9. The improvement of claim 1, wherein said lid member top rear edge has a flat outer edge.

10. The improvement of claim 1, wherein said lid member top rear edge has a rounded outer edge.

* * * * *